United States Patent
Kalhan

(10) Patent No.: US 7,826,340 B2
(45) Date of Patent: *Nov. 2, 2010

(54) HIERARCHICAL MODULATION REVERSE LINK INTERFACE NODE PROVIDING MULTIPLE SERVICE LEVELS

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 688 days.

This patent is subject to a terminal disclaimer.

(21) Appl. No.: 11/844,925

(22) Filed: Aug. 24, 2007

(65) Prior Publication Data

US 2009/0052394 A1   Feb. 26, 2009

(51) Int. Cl.
*H04J 9/00* (2006.01)
(52) U.S. Cl. .................................... 370/204
(58) Field of Classification Search ............ None
See application file for complete search history.

(56) References Cited

U.S. PATENT DOCUMENTS

| 6,393,295 | B1 | 5/2002 | Butler et al. |
| 6,944,460 | B2 | 9/2005 | Haartsen |
| 6,965,585 | B2 | 11/2005 | Grilli et al. |
| 2004/0090937 | A1 | 5/2004 | Chaskar et al. |
| 2005/0059400 | A1 | 3/2005 | Jagadeesan et al. |
| 2006/0056448 | A1 | 3/2006 | Zaki et al. |
| 2006/0088112 | A1* | 4/2006 | Das et al. ............. 375/260 |
| 2006/0121916 | A1 | 6/2006 | Aborn et al. |
| 2006/0182026 | A1* | 8/2006 | Zhu et al. ............. 370/229 |
| 2008/0025323 | A1* | 1/2008 | Khan ................... 370/400 |
| 2008/0159430 | A1* | 7/2008 | Steer et al. ............ 375/267 |
| 2008/0247470 | A1* | 10/2008 | Wang et al. ........... 375/241 |

FOREIGN PATENT DOCUMENTS

| WO | WO 02/054820 A2 | 7/2002 |
| WO | WO 2004/084463 A2 | 9/2004 |

* cited by examiner

*Primary Examiner*—Anh-Vu Ly

(57) ABSTRACT

A wireless communication device transmits a hierarchically modulated reverse link (RL) WWAN signal comprising a lower modulation order component corresponding to first service level data and a higher modulation order component corresponding to second service level data. An interface node receives and demodulates the hierarchical modulated signal to recover second service level data. The interface node sends second service level data to a recipient.

21 Claims, 6 Drawing Sheets

HIERARCHICAL MODULATION REVERSE LINK INTERFACE NODE PROVIDING MULTIPLE SERVICE LEVELS

RELATED APPLICATIONS

This application is related to U.S. patent application entitled "HIERARCHICAL MODULATION REVERSE LINK INTERFACE NODE", Ser. No. 11/844,915, filed concurrently with this application and incorporated by reference in its entirety, herein.

FIELD

This invention generally relates to wireless communications and more particularly to a hierarchical modulation reverse link interface node and method for providing multiple service levels.

BACKGROUND

Many wireless communication systems include geographically distributed base stations that provide wireless service to user equipment (UE) devices such as cellular telephones, wireless personal digital assistants (PDAs), and two way pagers. Information that is transmitted from the UE device may be delay-tolerant data and real-time data. Delay tolerant data includes data that does not need to be received by the recipient in real-time and can experience some delay without affecting the quality of the communication. On the other hand, real-time data may experience only minimal delays before the quality is degraded. An example of real-time data included real-time voice communication where two or more parties are speaking to each other. Another example includes video images that are captured and transmitted in real time where the recipient is observing the video as it is captured. Examples of delay tolerant data include email messages, text messages, and the transfer of files. Although delay tolerant data may include video or voice data, the delays do not significantly impact service. Due to limited communication resources, such as bandwidth, it is often advantageous to provide multiple level of service where delay tolerant data is transmitted using a mechanism that efficiently utilizes resources at the expense of adding delay to the transmission. Real-time data is utilizes resources as needed without delay. In wireless wide area networks, the ability of a base station to receive a signal sent from a UE device depends on various factors such as distance between the UE device and the base station, noise, obstructions, and the number of other devices communicating with the base station as well as the type of signal modulation. Modulation schemes that offer higher data rates are not as easily demodulated at the base station since the base station must decipher between signal components that are closer together than lower modulation order signals. Although a lower modulation order may be used to transmit the reverse link signal, less data can be transmitted. The allocation of resources for multiple service levels is burdened by the poor channel conditions often limiting the services that can be provided.

Therefore, there is a need for a hierarchical modulation reverse link interface node for providing multiple service levels.

SUMMARY

A user equipment (UE) device transmits a hierarchically modulated reverse link (RL) WWAN signal to an interface node and to a base station within a wireless wide area network (WWAN). The hierarchically modulated signal includes a lower modulation order component corresponding to first service level data and a higher modulation order component corresponding to second service level data. The interface node intercepts the hierarchical modulated signal and forwards the second service level data recovered from the higher modulation order component to a recipient through a communication network.

DETAILED DESCRIPTION

Figure 1:
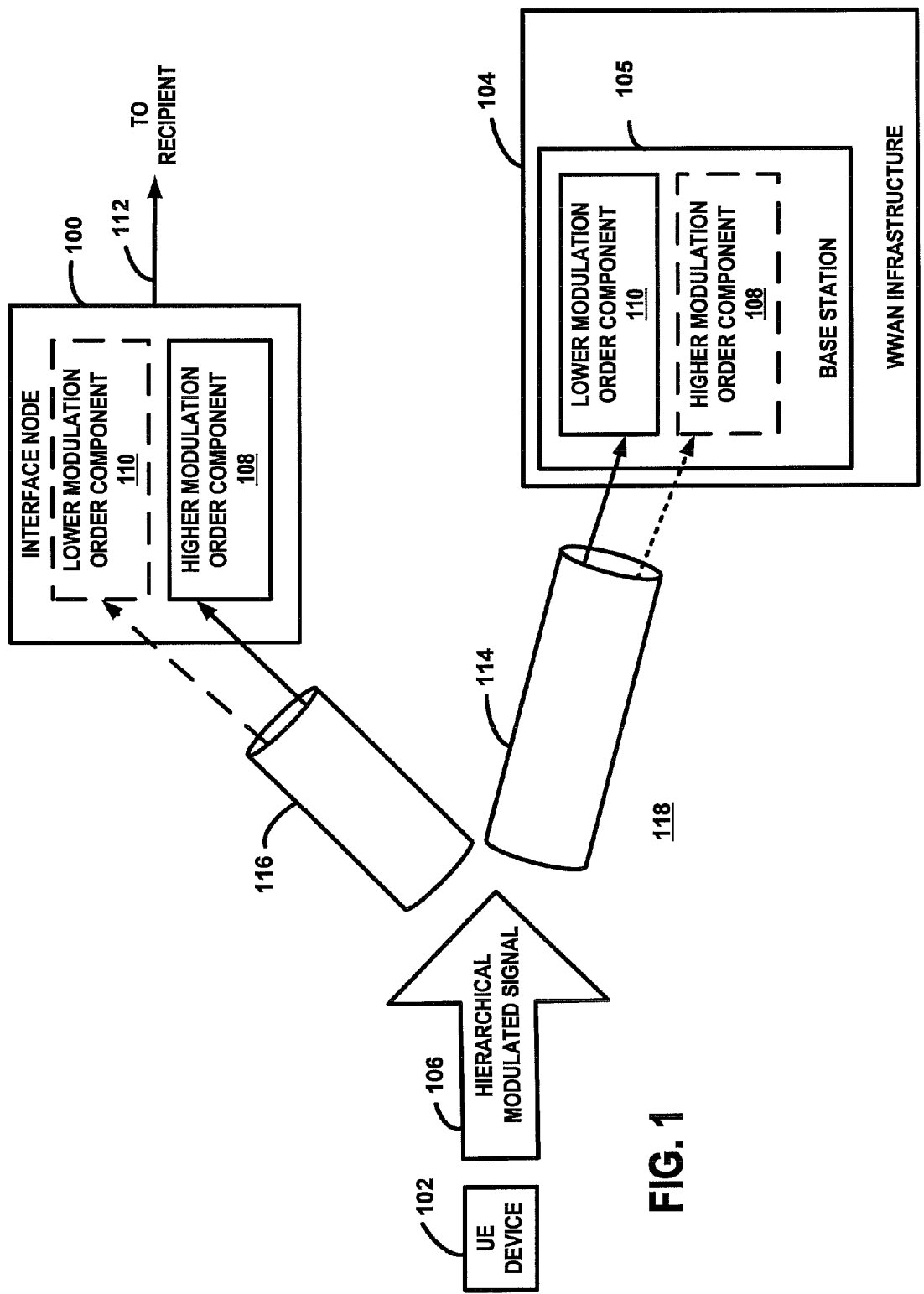
FIG. 1 is a block diagram of an interface node communicating with a user equipment (UE) device and a wireless wide area network (WWAN) in accordance with an exemplary embodiment of the invention.

FIG. 1 is a block diagram of an interface node 100 communicating with a user equipment (UE) device 102 and a wireless wide area network (WWAN) 104 to provide multiple service level communication services. The UE device 102 transmits a hierarchical signal 106 to a base station 105 in the WWAN and to the interface node 100 where at least two service levels can be provided to the user for uplink communication. In the exemplary embodiment, a first service level facilitates transmission of real-time data such as real-time voice transmissions and a second service level facilitates transmission of delay-tolerant data such as email and file uploads. As explained in further detail below, the UE device 102 generates and transmits a hierarchical modulated signal 106 that includes a lower modulation order component 110 including first level service data and a higher modulation order component 108 including a second level service data. For the example described herein, therefore, the first level service data is real-time data and the second level service is delay-tolerant data.

Depending on the communication channel 114 between the UE device 102 and the base station 105, the base station 105 may not be able to recover the higher modulation order component 108. For example, due to distance, obstacles, noise, multi-path interference and/or other factors, the signal to noise ratio of the signal may not be adequate for reception by the base station 105. The lower modulation order component 110, however, may be recoverable after transmission of the signal 106 through the channel 114. For example, where the higher modulation order is 16 Quadrature Amplitude Modulation (QAM) and the lower modulation order is Quadrature Phase Shift Keying (QPSK), the base station 105 may be able to distinguish between the four points within the QPSK constellation but may not be able to determine which of the 16 points of the QAM constellation had been transmitted. Where the communication channel 116 between the UE device 102 and the interface node 100 is of sufficient quality, the interface node 100 recovers the higher modulation order component 108 and is able to demodulate the signal 106 to recover the data 112 transmitted using the higher modulation order. The interface node forwards the data 112 to the recipient.

Any of numerous techniques may be used to manage the communications through the interface node 100. In the exemplary embodiment, the interface node 100 transmits information regarding the communication link between the UE device 102 and the interface node 100 to the base station 105. Based on at least the quality of the link, the base station 105 assigns an appropriate modulation order to the UE device 102 for transmission of second level service data. In some circumstances, the assignment may be based on the type and volume of data, the availability of communication resources, user priority level, and/or other factors.

In some circumstances, the base station 105 may not be able to recover the lower modulation order component 110 or the higher order modulation component 108 because of channel 114 conditions. In such as situation, the lower modulation component data may be forwarded from the interface node 100 to the WWAN 104. For the situation discussed with reference to FIG. 1, however, the condition of the channel 114 is such that the base station 105 is able to demodulate the lower modulation order component 110.

Also, in the exemplary embodiment, the base station 105 does not demodulate the higher modulation order component even if the channel conditions are adequate. Accordingly, FIG. 1 shows the lower modulation order component 110 as a solid arrow and a solid line block and the higher modulation order component 108 as a dashed arrow and a dashed line block at the base station 105 to illustrate that the lower modulation order component 110 can be recovered by the base station 105 and that the higher modulation order component 108 is not recovered by the base station 105.

Although in some circumstances the interface node 100 may be required to demodulate the lower modulation order component, the interface node 100 does not demodulate the lower modulation order component in the exemplary embodiment. Accordingly, FIG. 1 shows the lower modulation order component 110 as a dashed arrow and a dashed line block and the higher modulation order component 108 as a solid arrow and a solid line block at the interface node 100 to illustrate that the higher modulation order component 108 can be recovered by the interface node 100 and that the lower modulation order component 110 is not recovered by the interface node 100.

The channel used to transmit the second service level data 112 from the interface node 100 to the intended recipient may be a wired communication channel or a wireless communication channel and may include any combination of networks, equipment, and/or devices. Examples of suitable communication channels include wired links and wireless IP protocol channels that may include the Internet or an intranet, and point to point microwave channels.

The WWAN 104 and the UE device 102 are part of a wireless communication system 118 that may include any number of base stations and infrastructure. Although the principles discussed herein may be applied to any of numerous communication systems, protocols, arrangements and configurations, the wireless communication system 118 is implemented in accordance with WWAN systems such as cellular communication systems. Examples of some suitable communication technologies include those operating in accordance with Code Division Multiple Access (CDMA) standards such as cdma2000 1×, 1×EV-DO, and W-CDMA. In some circumstances, the wireless communication system 118 may operate with other standards such as OFDM based standards or GSM standards, for example. The wireless communications system 118 includes several base stations 105 geographically dispersed to provide wireless services to UE devices 102 within geographical regions. Interface nodes 100 are geographically dispersed and are in communication with one or more base stations through wireless or wired channels. A base station 105 may communicate with any number of interface nodes and UE devices 102. In some situations, an interface node 100 is implemented within a wireless local area network (WLAN) access point (AP) that is part of a WLAN.

The various functions and operations of the blocks described with reference to the wireless communication system 118 may be implemented in any number of devices, circuits, or elements. Two or more of the functional blocks may be integrated in a single device and the functions described as performed in any single device may be implemented over several devices. For example, at least portions of the functions of the base stations 105 may be performed by base transceiver stations (BTSs), base station controllers (BSCs), or mobile switching centers (MSCs) in some circumstances. Further, in some situations, other modulation order combinations can be used. Examples of other suitable combinations include BPSK and QPSK, 16-QAM and 64-QAM, 64-QAM and 256-QAM, and other combinations thereof. Further, the hierarchical modulation scheme may include more than two modulation orders and service levels. For example, BPSK could be used for the lower modulation order, QPSK could be used for an intermediate modulation order, and 16 QAM could be used for the higher modulation order. Other combinations are possible using phase-offsets (e.g., Offset-QPSK).

Figure 2:
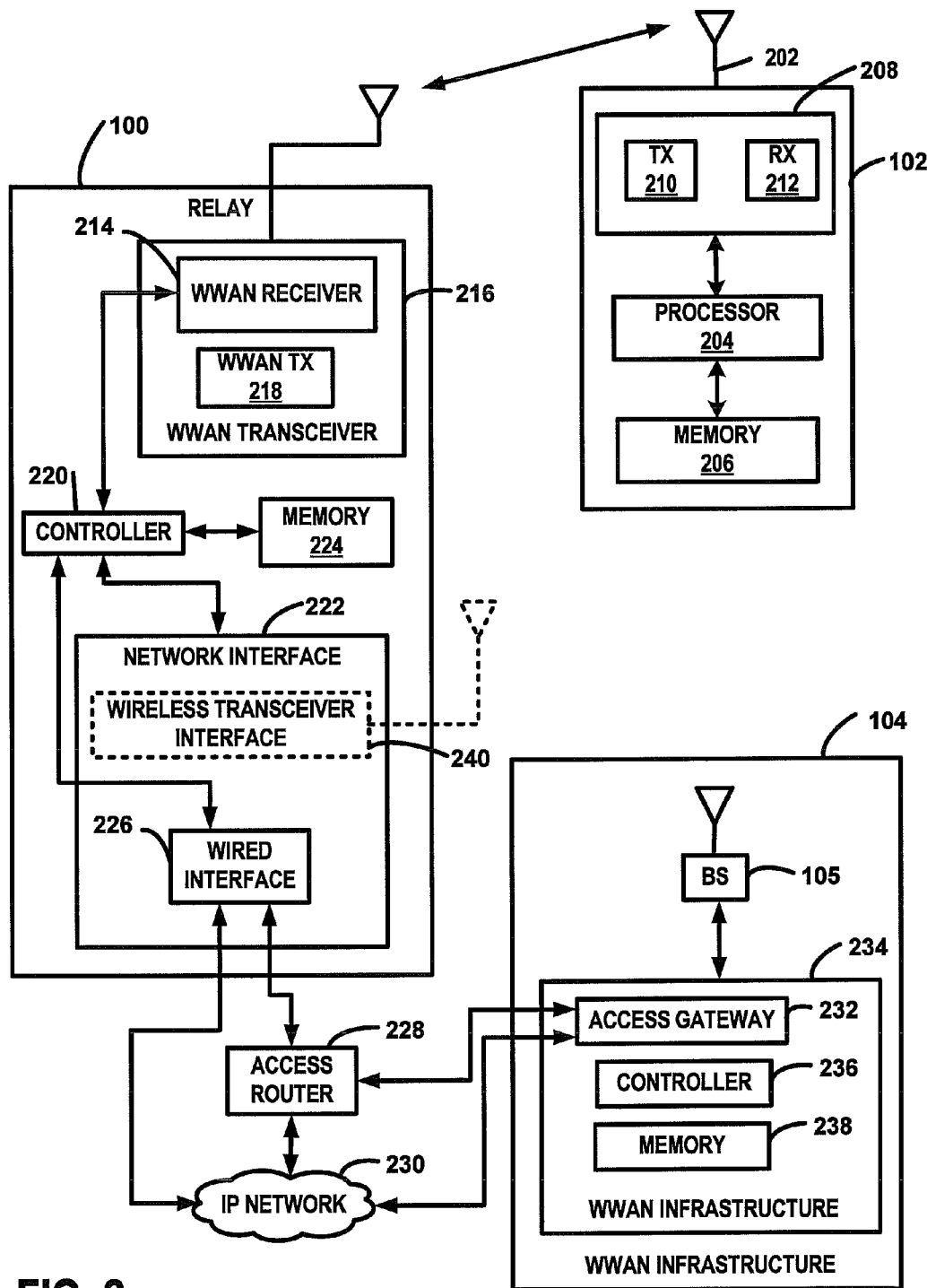
FIG. 2 is a block diagram of the interface node in communication with the UE device and the WWAN through a network in accordance with the exemplary embodiment.

FIG. 2 is a block diagram of an interface node 100 in communication with a WWAN 104 and a UE device 102 in accordance with the exemplary embodiment. The WWAN 104, base station 105, UE device, and interface node 100 may be implemented using any combination of hardware, software and/or firmware. The various functions and operations of the blocks described with reference to the base station 105, interface node 100, and UE device 102 may be implemented in any number of devices, circuits, or elements. Further, two or more of the functional blocks may be integrated in a single device and the functions described as performed in any single device may be implemented over several devices.

Each UE device 102 includes at least one antenna 202, a processor 204, a memory 206, and an air interface with radio frequency transceiver 208 having a transmitter (TX) 210 and receiver (RX) 212 for communicating with the base station 105. Those UE devices 102 having multi-mode capabilities also include an additional network interface and transceiver for communicating with a WLAN access point. The processor 204 and the transmitter 210 are configured to perform hierarchical modulation and to transmit the hierarchical modulated signal 106. The processor 206 performs baseband processing of digitized information that typically comprises modulation and demodulation, encoding and decoding, interleaving and de-interleaving, multiplexing and de-multiplexing, error correction operations and the like. An example of a suitable processor 204 includes implementation of the functions in one or more digital signal processors (DSPs) and/or application specific integrated circuits (ASICs). The memory 206 stores one or more software programs executed by the processor 204 to perform its functions as well as storing information related to identification, protocols, and other data.

The UE device 102 transmits the hierarchical modulated signal 106 to the base station 105 which only demodulates the lower modulation order component 110 in the exemplary embodiment. The base station 105 hierarchically demodulates the received hierarchical signal 106 to recover the first service level data. In the exemplary embodiment, the first service level data includes real-time voice information to facilitate a two-way telephone call.

The interface node 100 includes at least a WWAN receiver 214 for receiving WWAN signals from one or more UE devices 102 and a network interface 222 for communicating with the WWAN 104. In the exemplary embodiment, the WWAN receiver 214 is part of a WWAN transceiver 216 that includes a WWAN transmitter 218 to facilitate two-way communication with UE devices 102. In some circumstances, the WWAN transmitter can be omitted. Where the interface node 100 is implemented as part of a WLAN access point, the access point also includes hardware and software for providing WLAN services. The interface node 100 further comprises a controller 220 coupled to the WWAN interface 222 and the WWAN receiver 214. The controller 220 performs the control functions described herein as well as performing other functions and facilitating the overall operation of the interface node 100. The controller 220 is connected to, or includes, a memory 224 that may include one or more random access memory (RAM) and/or read only memory (ROM) memory devices.

The network interface 222 includes any combination of hardware, software and/or firmware for transmitting the higher modulation order data (second service level data) 112 to the WWAN 104. In the exemplary embodiment, a wired interface 226 communicates through an access router 228 and/or through an IP network 230 to an access gateway 232 within the WWAN infrastructure 234 servicing the base station 105. The wired interface 226 exchanges messages with the access router 228 and an internet protocol (IP) network 230. The wired interface 226 provides packet data communications and facilitates access to the Internet and to an access gateway 232 in the WWAN infrastructure 234 through the access router 228. In some circumstances, at least portions of the wired interface 226 may be implemented separately from the network interface 222. The access router 228 may be connected to other interface nodes 100 or to WLAN access points and may also provide communication management and control functions to a WLAN. In some situations, the access router 228 may be implemented within an interface node 100 or WLAN access point or may be eliminated. In some circumstances, the connection between the access gateway 232 and the interface node 100 may include a wireless communication link such as satellite communication link or point-to-point microwave link, for example. Further, the interface node 100 may utilize a wireless backhaul such as a WiMax or Point-to-Point links. In such situations, the network interface 222 includes a wireless interface transceiver 240 for communicating with the base station 105 or with equipment connected to the base station 105. Accordingly, a wireless receiver may be located at the base station 105 or elsewhere within the WWAN 104 to receive and transmit control data. The wireless interface transceiver 240 is illustrated with a dashed line block in FIG. 2 to indicate that the wireless interface transceiver 240 is not necessary where the wired interface 226 provides communication to the WWAN 104. Therefore, the wireless interface transceiver 240 may take the place of the wired interface 226, may be included in addition to the wired interface 226, or may be omitted.

The WWAN receiver 214 is configured to receive the hierarchical modulated signal 106 from at least one UE device 102. As discussed above, the hierarchical modulated signal 106 includes a lower modulation order component 110 and a higher modulation order component 108. The WWAN receiver 214 demodulates the hierarchical modulated signal 106 to recover the higher modulation data stream which is subsequently modulated or otherwise processed for transmission to the recipient. The lower modulation component corresponds to the first service level data and the higher modulation order corresponds the second service level data.

In addition to other information, the memory 224 stores communication device identification values corresponding to each UE device 102 that is served by the interface node 100. The communication device identification value may include an electronic serial number (ESN) or other unique data. The identification values may be stored at the interface node 100 using any of numerous techniques. An example of a suitable method of storing the values includes storing the values during an initialization procedure performed when the interface node 100 is installed or during periodic updates to the interface node 100. In the exemplary embodiment, the identification information received from the WWAN infrastructure 234 includes identification values identifying the local UE devices 102 that may be near the interface node 100. Accordingly, the identification information allows the interface nodes 100 to update the user list of devices that will be monitored. In some implementations, only identification values that are received from the WWAN infrastructure 234 are stored in the user list. In other situations, the user list may include a combination of identification values that are pre-programmed and values that are received from the WWAN infrastructure. The identification information may include any combination of parameters, numbers, identifiers or information that provides the interface node with adequate data for identifying the particular UE device 102.

During operation, the interface node 100 monitors the reverse link WWAN channel(s) that may contain a reverse link hierarchical modulated signals 106 transmitted from a UE device 102. The reverse link WWAN receiver 214 is tuned, or otherwise configured, to receive the reverse link hierarchical modulated signals 106. In the exemplary embodiment, the base station 105 is notified of the quality of the communication link between the UE device 102 and the interface node. After a UE device 102 is detected, the interface node 100 monitors the communication channel 116 and generates a channel quality indicator based on the quality. The channel quality indicator may be any of numerous parameters or characteristics. Examples of suitable quality indicators include received signal strength and signal to noise ratio (SNR). The channel quality indicator is forwarded to the base station 105 which utilizes the information to allocate resources and assign a modulation scheme and a transmission schedule to the UE device 102. The allocation of resources may be based on other factors such as available capacity, bandwidth requirements of the uplink transmission, and user priority.

Once the transmission schedule is established, the appropriate information is sent to the interface node 100 and to the UE device 102. Control schemes in accordance with known techniques are used to assign communication parameters to the UE device 102. The interface node 100 uses the information provided by the base station 105 to receive signals transmitted from the UE device 102. As described below in further detail, the hierarchical signal 106 is received and demodulated to recover the higher modulation component 108. The recovered data stream (second service level data) 112 is forwarded to the recipient through the network interface 222. The data 112 may be routed through any number of networks or systems before reception by the recipient. For example, the data 112 may include and email that is transmitted through the Internet and through WWAN system or a WLAN system to a wireless mobile device.

In the exemplary embodiment, the WWAN infrastructure 234 comprises a packet switched core network that includes at least one access gateway 232. A controller 236 includes a processor, computer, processor arrangement, or other processing device where at least some functions of the access gateway may be performed by the controller 236. In the exemplary embodiment, the controller includes a Position Determination Entity (PDE) and/or other location determining processors such as Location Server. A memory 238 includes any suitable memory device such as RAM or ROM that provides electronic storage of information. In addition to other types of information, the memory stores information regarding identification information and interface node 100 locations. The access router 228 may be connected to the access gateway 232 using any combination of wired and wireless connections. Examples of suitable connections include T1 lines, fiber optic cable, coaxial cable, and point-to-point microwave. The access gateway 232 is a communication interface that allows the interface node 100 to communicate with the WWAN infrastructure 234. The various components and functions of the WWAN infrastructure 234 may be implemented using several devices dispersed throughout the core network. For example, the processing functions for determining which UE devices 102 should be monitored may be implemented in a server that is connected to a PDE located in different location.

Figure 3:
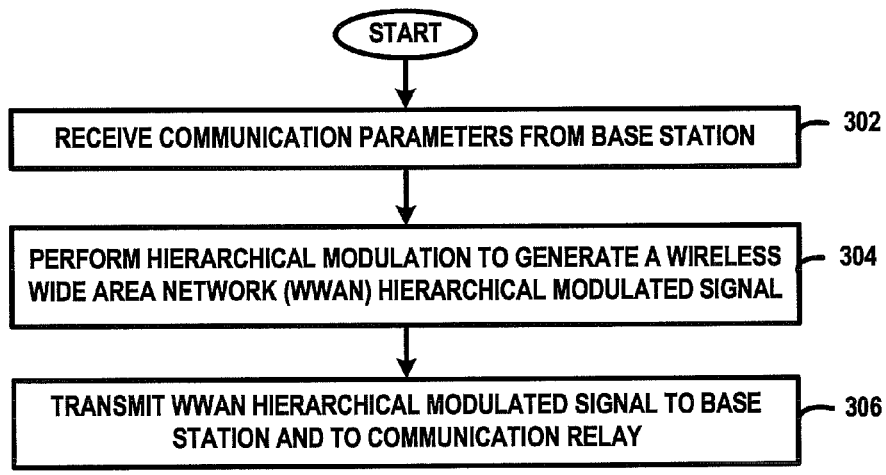
FIG. 3 is a flow chart of a method performed in a UE device in accordance with the exemplary embodiment of the invention.

FIG. 3 is a flow chart of a method performed in a UE device 102 in accordance with the exemplary embodiment of the invention. Although the method may be performed using any combination of hardware, software and/or software within a UE device 102, the method is at least partially performed by executing software code in the processor in the exemplary embodiment.

At step 302, the UE device 102 receives communications parameters from the base station 105 indicating at least the modulation orders for transmission. In accordance with known control techniques, the base station 105 transmits control signals assigning the lower modulation order and the higher modulation order for the uplink transmissions from the UE device 102. Other parameters, such as power control levels and timing information are also assigned. The assignment of the higher modulation order may be in response to a request from the UE device 102 for communication resources in addition to voice communication.

At step 304, hierarchical modulation is performed to generate the hierarchical modulated signal. A base data signal and an extended data signal are modulated and interleaved to create the hierarchical signal which includes the data from both data signals. Accordingly, the first level service data such as voice and second level service data such as delay-tolerant data are combined to form the hierarchical modulated signal 106.

At step 306, the hierarchical modulated signal is transmitted. In most situations, the communication path 114 from the UE device to the base station 105 will be different from the communication path 116 to the interface node 100.

Figure 4:
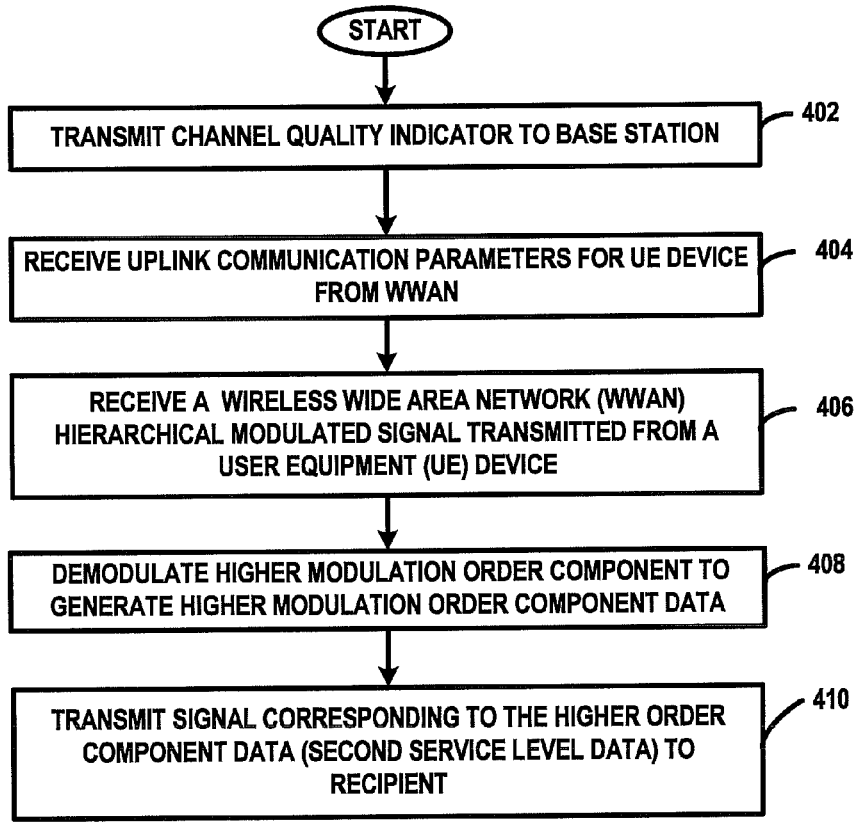
FIG. 4 is a flow chart of a method performed at the interface node in accordance with the exemplary embodiment of the invention.

FIG. 4 is a flow chart of a method performed at the interface node 100 in accordance with the exemplary embodiment of the invention. Although the method may be performed using any combination of hardware, software and/or firmware within the interface node 100, the method is at least partially performed by executing software code on the controller 220 in the exemplary embodiment.

At step 402, a channel quality indicator is transmitted to the base station 105. After the interface node 100 detects a UE device 102, the channel 116 is monitored by evaluating a signal transmitted from the UE device 102. In the exemplary embodiment, the interface node 100 utilizes information provided by the WWAN to receive and demodulate up link signals transmitted to the base station 105. One or more channel quality parameters such as signal to noise ratio, signal strength, signal attenuation, or bit error rates (BER) are generated and transmitted to the base station 105.

At step 404, uplink communication parameters are received from the base station 105. The uplink communication parameters provide information regarding the assignment of communication resources to the UE device 102 and at least provide modulation order and scheduling information that has been assigned to the UE device 102.

At step 406, the hierarchical modulated signal 106 is received from the UE device 102. In the exemplary embodiment, the hierarchical modulated signal 106 is a reverse link (RL) WWAN signal that is received over a communication path 116 from the UE device 102 to the interface node 100. The hierarchical modulated signal 106 includes the lower modulation order component 110 corresponding to the base data signal and includes the higher modulation order component 108 corresponding to the extended data signal.

At step 408, the higher modulation order component is demodulated. As discussed below in further detail, the extended data signal is recovered by performing hierarchical demodulation, de-interleaving and decoding. In some situations, both the lower modulation order component and the higher modulation order component are recovered.

At step 410, the second service level data (extended component) is forwarded to the recipient. In the exemplary embodiment, a communication link is established with the network and, in some cases, the recipient's user equipment before the extended component is forwarded. For example, if the second service level data is an email, the interface node 100 establishes a communication link with the Internet and transmits the email message using IP protocols.

The extended data signal is formatted, modulated, or otherwise processed to form a signal for transmission to the network or to a WLAN where the interface node 100 is part of, or is connected to, a WLAN access point. The signal may be generated and transmitted using any of numerous wired and/or wireless technologies. In the exemplary embodiment, the extended data signal (second service level data) is transmitted through the IP network 230. In some circumstances, the extended data signal is forwarded to the base station 105 or the to the WWAN 104.

Figure 5:
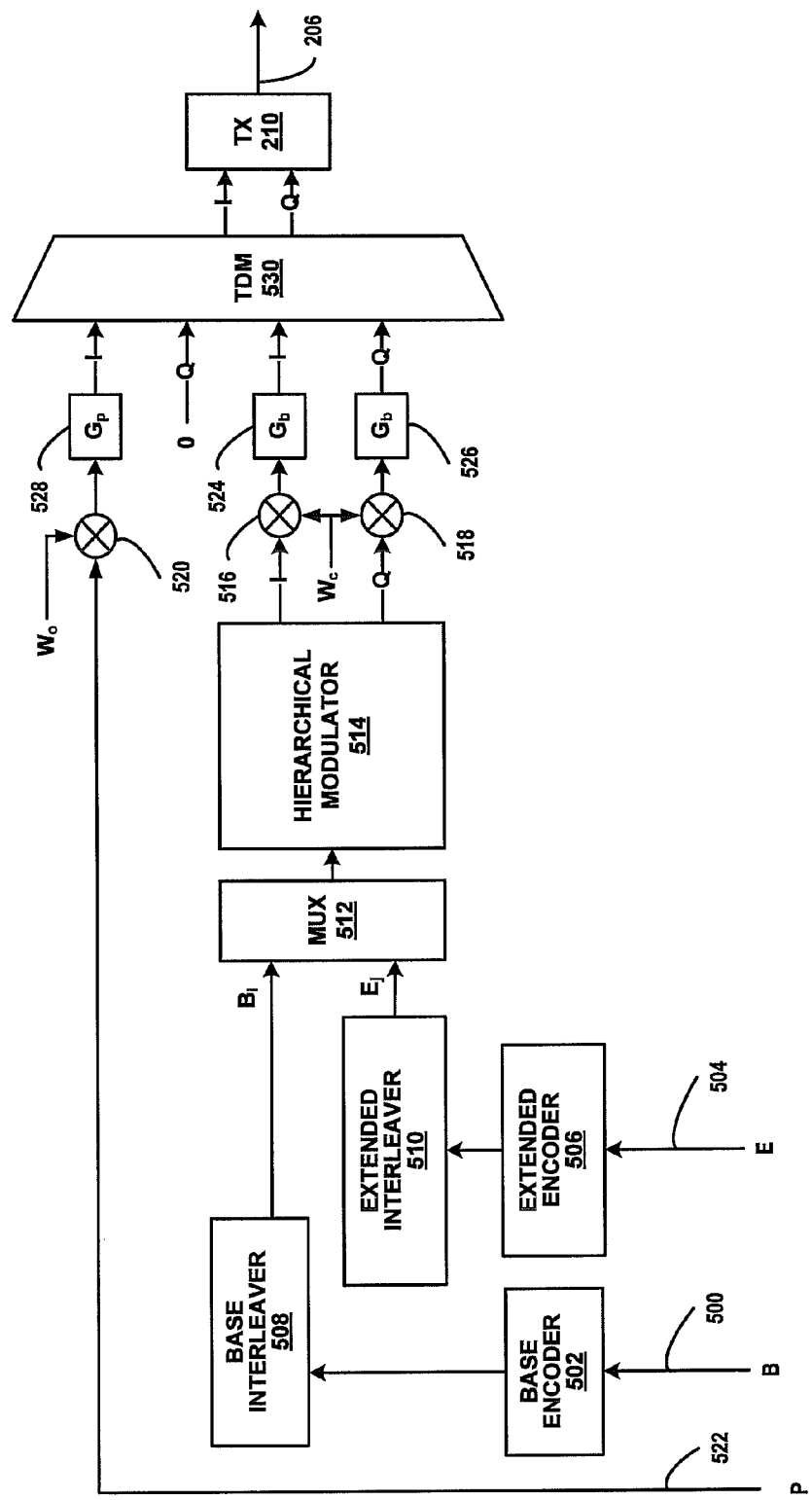
FIG. 5 is a block diagram of the hierarchical modulation functions within the UE device.

FIG. 5 is a block diagram of the hierarchical modulation functions within the UE device 102. The functional blocks illustrated in FIG. 5 are implemented by at least portions of the transmitter 210, memory 206, and processor 204 of the UE device 102 in the exemplary embodiment. The various functions and operations of the blocks described with reference to FIG. 5, however, may be implemented in any number of devices, circuits, or elements embodied in any combination of software, hardware and/or firmware. Two or more of the functional blocks may be integrated in a single device and the functions described as performed in any single device may be implemented over several devices.

A base data signal 500 is received at a base component encoder 502 and an extended data signal 504 is received at an extended component encoder 506. The base data signal 500 and the extended data signal 504 may include any of numerous types of data and signals and correspond to the first service level data and the second service level data, respectively. Each data signal is encoded and processed in accordance with known techniques before the signals are interleaved by a base interleaver 508 and an extended component interleaver 510. The encoders 502, 506 and interleavers 508, 510 provide error correction processing and may employ any suitable error correction coding, such as turbo coding. The interleavers 508, 510 may employ any suitable interleaving algorithm. The encoding and interleaving schemes used by one component may be different from those used by the other component.

A multiplexer (MUX) 512 multiplexes the interleaved signals before the hierarchical modulator 514 modulates the multiplexed signal. Multipliers 516, 518, 520 multiply Walsh-codes ($W_0$, $W_C$) with the in-phase and quadrature components and with a pilot signal 522. Gain multipliers 524, 526, 528 adjust the gain of the in-phase and quadrature components and the pilot signal respectively. A time division multiplexer (TDM) 530 time division multiplexes the pilot, in-phase and quadrature signals to generate the hierarchical modulated signal 206 that is transmitted by the transmitter 210 through the antenna.

Figure 6:
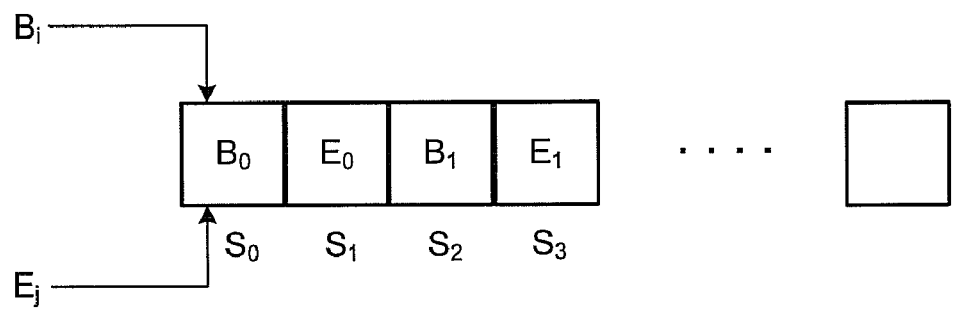
FIG. 6 is a graphical illustration of a mapping of the component data bits into layered modulation symbols.

FIG. 6 is a block diagram of a mapping of bits into layered modulation symbols. Each of the base and extended components are individually encoded and interleaved by the interleavers 508, 510. The outputs $B_i$, $E_j$ are multiplexed by the multiplexer 514 to generate the symbols $S_0$, $S_1$, $S_2$, $S_3$. Depending on the number of parameters that make up the base component, the multiplexing may be varied. For example, instead of alternating the bits from each of the components for multiplexing, each base bit may be followed by three extended bits.

Figure 7:
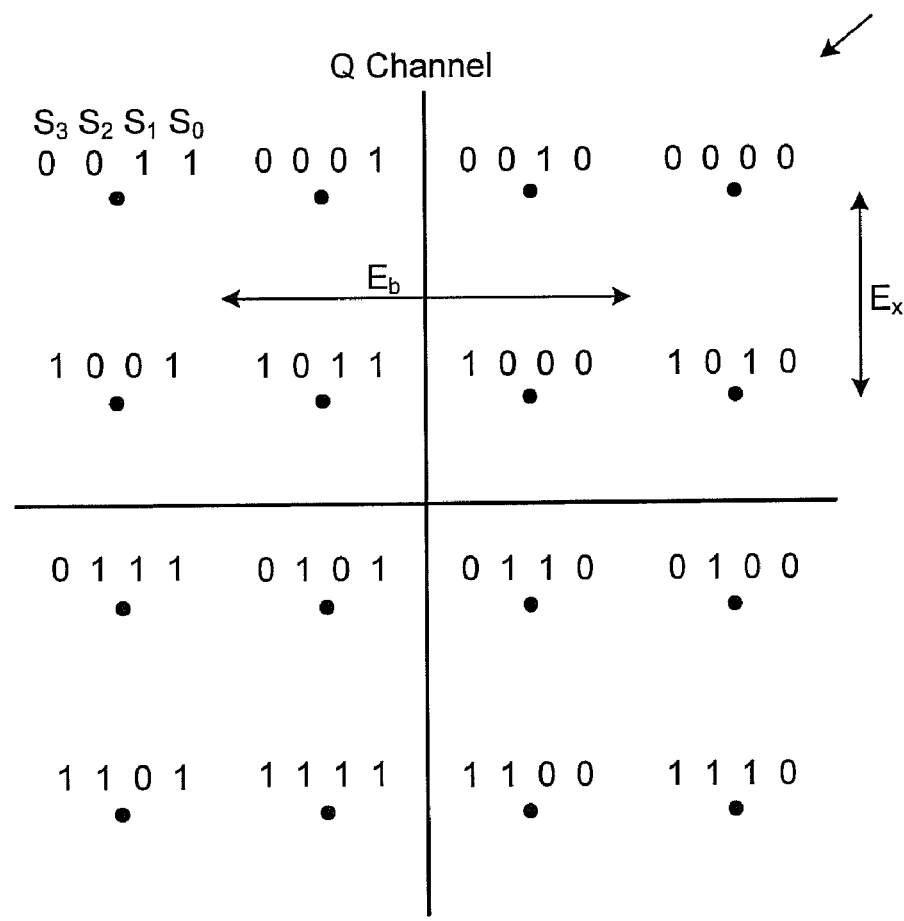
FIG. 7 is a graphical representation of an exemplary 16-QAM constellation illustrating the hierarchical modulation symbols produced by the hierarchical modulator.

FIG. 7 is a graphical representation of an exemplary 16-QAM constellation 700 illustrating the hierarchical modulation symbols produced by the hierarchical modulator 514. In this example, each modulation symbol represents four multiplexed bits (i.e., $S_3$, $S_2$, $S_1$, $S_0$). The multiplexed bits from the base component are represented by $S_0$ and $S_2$, while the multiplexed bits from the extended component are represented by $S_1$ and $S_3$. The modulation symbols are constructed such that $S_0$ and $S_2$ do not change within the same quadrant. Therefore, the multiplexed bits from the base component are essentially QPSK modulated while the multiplexed bits from the extended component are 16-QAM modulated.

As shown in FIG. 5, the base and extended components are modulated and then transmitted along with a pilot signal. The pilot gain ($G_p$) is independent from the gain ($G_b$) for the base and extended. To improve reception of the base components, the UE device 102 can adjust the gain $G_b$ such that the base data signal can be demodulated successfully if the interface node 100 successfully receives the pilot signal.

Figure 8:
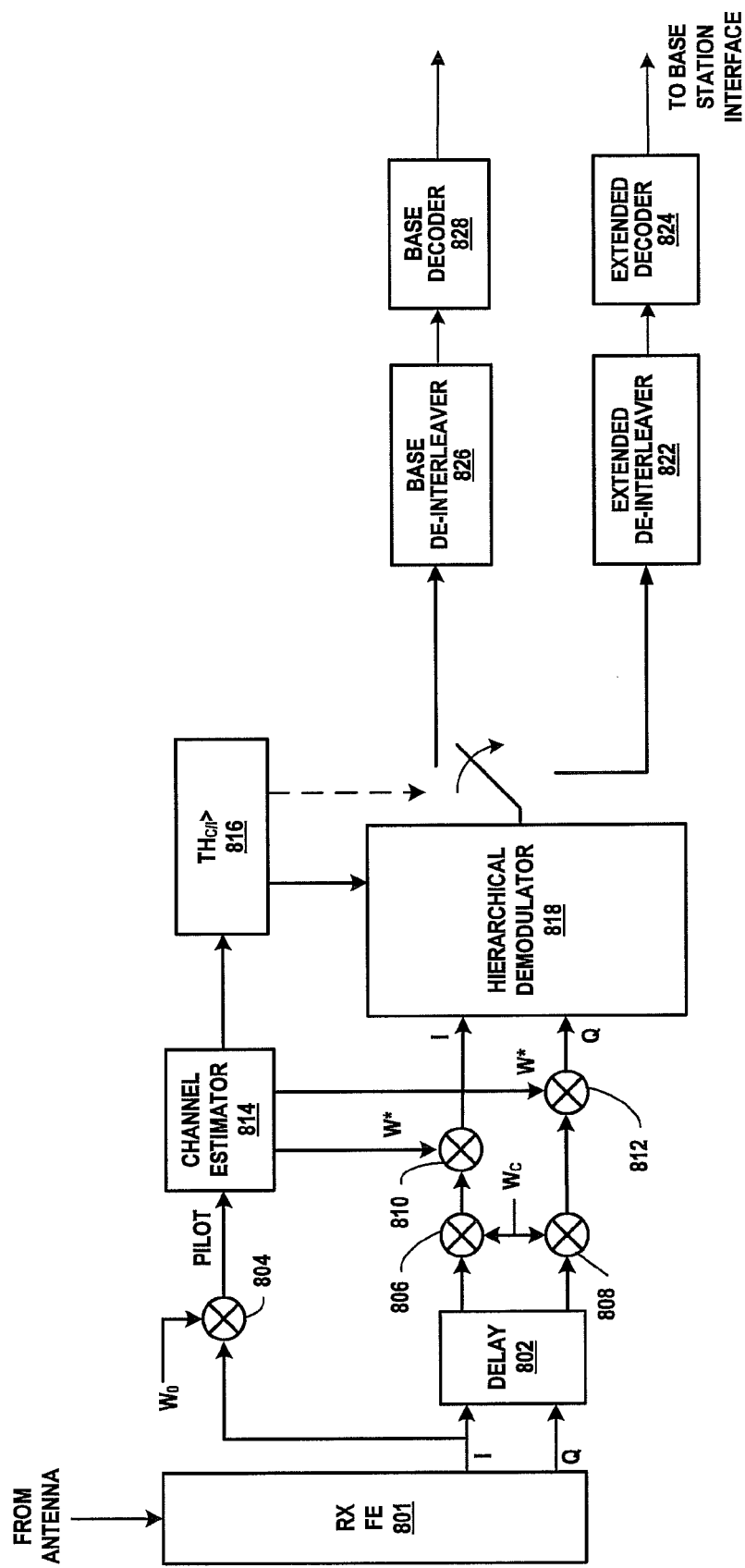
FIG. 8 is a block diagram of an exemplary WWAN receiver for performing hierarchical demodulation in the interface node.

FIG. 8 is a block diagram of an exemplary WWAN receiver 214 for performing hierarchical demodulation in the interface node 100. In addition to other components, the receiver 214 includes a receiver front end (RX FE) 801, a delay buffer 802, Walsh-code ($W_0$, $W_C$) and coefficient (w*) multipliers 804, 806, 808, 810, 812, channel estimator 814, threshold comparator 816, hierarchical demodulator 818. After descrambling the Pilot using Walsh-code $W_0$, a channel estimation is performed to estimate the weights, w* and the SNR. The delayed data is de-scrambled by using Walsh-code Wc and then equalized by using coefficients. Depending upon the SNR of the current signal, either QPSK or 16-QAM demodulation could be used. The receiver 214 also has the base component de-interleaver 826 and decoder 828, and extended component de-interleaver 822 and decoder 824. In some situations, the base de-interleaver 826 and the base decoder 828 may be omitted. At least some of the functional blocks may be implemented within the controller 220. The various functions and operations of the blocks described with reference to FIG. 8, however, may be implemented in any number of devices, circuits, or elements embodied in any combination of software, hardware and/or firmware. Two or more of the functional blocks may be integrated in a single device and the functions described as performed in any single device may be implemented over several devices.

The channel estimator 814 provides a signal strength indicator, C/I, to the threshold comparator 816, which determines the modulation order to be used by the hierarchical demodulator 818. The threshold comparator 816 can include one or more look-up tables (LUTs) to store signal-to-noise ratio (SNR) ranges and corresponding modulation order values. The LUTs for the SNR may be updated depending on the relative levels of the pilot gain ($G_p$) and the gain used in the base component, since the pilot level transmitted may change depending on traffic conditions. The LUTs may also contain code-rate information. If the threshold comparator 816 indicates that SNR is good (below the threshold), both base and extended components can be demodulated successfully using the 16-QAM demodulator.

However, if the threshold comparator 816 indicates a low SNR, it is possible that only the base component can be successfully demodulated. In this case, for each received 16-QAM symbol, the layered demodulator 818 only needs to determine in which quadrant the symbol has the least probability of error. Instead of choosing among the sixteen possible 16-QAM symbols, the layered demodulator 818 only needs to make a decision based on four possible outcomes (similar to QPSK demodulation). This is possible because the modulation symbol for each quadrant does not change with respect to the base component bits. As discussed above, other modulation order combinations can be used in some situations.

Alternatively, a receiver (both at the relay and the base station) may monitor signal strength and attempt to recover the signals without a threshold comparison. In this case, the receiver demodulates both the base and extended components at all times. The base and extended components may indicate successful recovery of the overhead messages depending on the outcome of error checking, e.g., the CRC (cyclic redundancy check) or equivalent, for each of the components.

Therefore, the UE device 102 can utilize multiple QoS communications with a single transmission resulting in efficient use of resources such as battery power and control-signaling overhead. Multiple services are provided in a single session. In addition, the use of WWAN uplink traffic resources is minimized for the transmission requiring only control signaling to facilitate the multiple service transmission.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An interface node comprising:
   a receiver to receive a wireless wide area network (WWAN) hierarchical modulated signal transmitted from a user equipment (UE) device, the WWAN hierarchical modulated signal comprising a lower modulation order component corresponding first service level data and a higher modulation order component corresponding to second service level data, the higher modulation order assigned to the UE device by a base station and at least partially based on a quality of a link between the UE device and the base station and at least partially based on one or more of a type of data, a volume of data, and availability of communication resources, and a user priority level;
   a demodulator to demodulate the higher modulation order component to recover the second service level data; and
   a network interface to transmit the second service level data to a communication network.

2. The interface node of claim 1, wherein the first service level data is real-time data.

3. The interface node of claim 2, wherein the real-time data is voice data.

4. The interface node of claim 1, wherein the second service level data is delay-tolerant data.

5. The interface node of claim 1, wherein the network interface comprises an access router to connect to a wired communication network.

6. The interface node of claim 5, wherein the wired communication network comprises an Internet and an access gateway.

7. The interface node of claim 1, further comprising a network interface to receive uplink communication parameters from the base station for use by the UE device for uplink WWAN transmission, the uplink communication parameters comprising the higher modulation order.

8. The interface node of claim 1, wherein the higher modulation order component is modulated in accordance with a modulation selected from the group comprising QPSK, 16-QAM, 64-QAM and 256-QAM and wherein the lower modulation order is modulated in accordance with a modulation selected from the group comprising BPSK, QPSK, 16-QAM, and 64-QAM.

9. A wireless communication device comprising:
   a multiplexer to multiplex a first service level data signal and a second service level data signal to generate a multiplexed data stream;
   a modulator to modulate the multiplexed data stream to generate a wireless wide area network (WWAN) hierarchical modulated signal comprising a lower order modulation component corresponding to the first service level data signal and a higher order modulation component corresponding to the second service level data signal and modulated at a higher modulation order; and
   a WWAN transmitter to transmit the WWAN hierarchical modulated signal to an interface node over a first communication path and to a base station over a second communication path, the higher modulation order assigned to the wireless communication device by the base station and at least partially based on a quality of the second communication path and at least partially based on one or more of a type of data, a volume of data, and availability of communication resources, and a user priority level.

10. The wireless communication device of claim 9, wherein the first service level data is real-time data.

11. The wireless communication device of claim 10, wherein the real-time data is voice data.

12. The wireless communication device of claim 9, wherein the second service level data is delay-tolerant data.

13. The wireless communication device of claim 10, wherein the higher modulation order component is modulated in accordance with a modulation selected from the group comprising QPSK, 16-QAM, 64-QAM and 256-QAM and wherein the lower modulation order is modulated in accordance with a modulation selected from the group comprising BPSK, QPSK, 16-QAM, and 64-QAM.

14. A method comprising:
   receiving a wireless wide area network (WWAN) hierarchical modulated signal transmitted from a user equipment (UE) device, the WWAN hierarchical modulated signal comprising a lower modulation order component corresponding to first service level data and a higher modulation order component corresponding to second service level data, the higher modulation order component modulated at a higher modulation order assigned to the UE device by a base station and at least partially based on a link between the UE device and a wireless wide area network (WWAN) and at least partially based on one or more of a type of data, a volume of data, and availability of communication resources, and a user priority level;
   demodulating the higher modulation order component to recover the second service level data; and
   sending the second service level data to a recipient.

15. The method of claim 14, wherein the first service level data is real-time data.

16. The method of claim 15, wherein the real-time data is voice data.

17. The method of claim 4, wherein the second service level data is delay-tolerant data.

18. The method of claim 14, further comprising receiving uplink communication parameters from the base station for use by the UE device for uplink WWAN transmissions, the uplink communication parameters comprising the higher modulation order.

19. The method of claim 14, wherein the sending the second service level data to a recipient comprises transmitting the higher modulation order component data to the recipient through a wired communication network.

20. The method of claim 19, wherein the wired communication network comprises an Internet and an access gateway.

21. The method of claim 14, wherein the higher modulation order component is modulated in accordance with a modulation selected from the group comprising QPSK, 16-QAM, 64-QAM and 256-QAM and wherein the lower modulation order is modulated in accordance with a modulation selected from the group comprising BPSK, QPSK, 16-QAM, and 64-QAM.

* * * * *